United States Patent
Campbell et al.

(10) Patent No.: US 9,841,173 B2
(45) Date of Patent: *Dec. 12, 2017

(54) INTERIOR REARVIEW MIRROR ASSEMBLY WITH INTEGRATED INDICATOR SYMBOL

(71) Applicant: GENTEX CORPORATION, Zeeland, MA (US)

(72) Inventors: Douglas C Campbell, Northville, MI (US); Rodger William Eich, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/169,406

(22) Filed: Jan. 31, 2014

(65) Prior Publication Data

US 2014/0146551 A1 May 29, 2014

Related U.S. Application Data

(63) Continuation of application No. 12/898,283, filed on Oct. 5, 2010, now Pat. No. 8,643,481, which is a continuation-in-part of application No. 12/885,191, filed on Sep. 17, 2010, now Pat. No. 9,180,819.

(51) Int. Cl.
| | | |
|---|---|---|
| *H04Q 1/00* | (2006.01) |
| *H04B 1/00* | (2006.01) |
| *G08C 19/00* | (2006.01) |
| *B60Q 1/00* | (2006.01) |
| *G09F 9/00* | (2006.01) |
| *G08B 5/22* | (2006.01) |
| *G08B 5/24* | (2006.01) |
| *F21V 23/04* | (2006.01) |
| *B60R 1/12* | (2006.01) |
| *B60Q 3/258* | (2017.01) |
| *B60Q 3/80* | (2017.01) |

(52) U.S. Cl.
CPC .......... *F21V 23/0485* (2013.01); *B60Q 3/258* (2017.02); *B60Q 3/80* (2017.02); *B60R 1/12* (2013.01); *B60R 2001/1215* (2013.01)

(58) Field of Classification Search
CPC ...... B60R 1/12; B60R 1/04; B60R 2001/1215
See application file for complete search history.

(56) References Cited

U.S. PATENT DOCUMENTS

| | | | | |
|---|---|---|---|---|
| 5,174,643 A | * | 12/1992 | Priesemuth | B60Q 3/0293 315/84 |
| 5,555,172 A | * | 9/1996 | Potter | G06F 3/0489 340/990 |
| 5,604,644 A | | 2/1997 | Lang et al. | |
| (Continued) | | | | |

FOREIGN PATENT DOCUMENTS

JP          01289725         11/1989

*Primary Examiner* — Steven Lim
*Assistant Examiner* — Muhammad Adnan
(74) *Attorney, Agent, or Firm* — Price Heneveld LLP; Bradley D. Johnson

(57) ABSTRACT

This invention relates to mirror assemblies for vehicles and in particular to interior rearview mirror assemblies having touch screen inputs corresponding to elements representing a symbol. The symbols are located behind a reflective element and not visible until activated by selection of the corresponding input or other means.

8 Claims, 6 Drawing Sheets

(56) References Cited

U.S. PATENT DOCUMENTS

| | | | |
|---|---|---|---|
| 5,786,772 A * | 7/1998 | Schofield | B60R 1/12 180/167 |
| 6,028,537 A * | 2/2000 | Suman | B60K 35/00 340/426.14 |
| 6,124,647 A * | 9/2000 | Marcus | B60C 23/0401 307/10.1 |
| 6,260,859 B1 * | 7/2001 | Dixon | B60G 17/005 280/5.514 |
| 6,614,579 B2 * | 9/2003 | Roberts et al. | 359/267 |
| 7,084,859 B1 * | 8/2006 | Pryor | 345/173 |
| 7,224,324 B2 * | 5/2007 | Quist et al. | 345/7 |
| 7,488,080 B2 | 2/2009 | Skiver et al. | |
| 7,817,020 B2 * | 10/2010 | Turnbull et al. | 340/438 |
| 8,169,307 B2 | 5/2012 | Nakamura et al. | |
| 8,643,481 B2 * | 2/2014 | Campbell | 340/438 |
| 8,704,653 B2 * | 4/2014 | Seder | B60R 1/00 340/435 |
| 8,886,399 B2 * | 11/2014 | El Dokor et al. | 701/36 |
| 9,663,029 B2 * | 5/2017 | Kim | B60Q 3/76 |
| 2001/0022731 A1 * | 9/2001 | Dupay | B62D 53/10 362/560 |
| 2003/0195035 A1 * | 10/2003 | Onuki et al. | 463/20 |
| 2004/0012573 A1 * | 1/2004 | Morrison | G06F 3/0428 345/173 |
| 2005/0231969 A1 * | 10/2005 | Fogg | B60Q 1/2665 362/494 |
| 2005/0264891 A1 * | 12/2005 | Uken et al. | 359/606 |
| 2006/0158351 A1 | 7/2006 | Lee et al. | |
| 2006/0255960 A1 * | 11/2006 | Uken et al. | 340/815.4 |
| 2007/0085157 A1 * | 4/2007 | Fadell et al. | 257/428 |
| 2007/0124694 A1 * | 5/2007 | Van De Sluis | G06F 3/017 715/775 |
| 2007/0228263 A1 * | 10/2007 | Shen et al. | 250/221 |
| 2008/0147321 A1 * | 6/2008 | Howard et al. | 701/211 |
| 2009/0067032 A1 | 3/2009 | Varaprasad et al. | |
| 2009/0096937 A1 * | 4/2009 | Bauer | B60R 1/12 348/739 |
| 2009/0115631 A1 | 5/2009 | Foote et al. | |
| 2009/0195376 A1 * | 8/2009 | Miller et al. | 340/457.1 |
| 2009/0201690 A1 | 8/2009 | Boivin et al. | |
| 2009/0243824 A1 * | 10/2009 | Peterson | B60R 1/12 340/435 |
| 2009/0251913 A1 | 10/2009 | Bruhnke et al. | |
| 2010/0007463 A1 * | 1/2010 | Dingman et al. | 340/5.72 |
| 2010/0097469 A1 * | 4/2010 | Blank | B60R 1/12 348/148 |
| 2011/0141062 A1 * | 6/2011 | Yu | G06F 3/0428 345/175 |
| 2011/0248863 A1 * | 10/2011 | Johnson | G08B 27/006 340/686.1 |
| 2012/0110511 A1 * | 5/2012 | Howard | 715/835 |
| 2012/0182242 A1 * | 7/2012 | Lindahl et al. | 345/173 |
| 2012/0236388 A1 * | 9/2012 | De Wind et al. | 359/267 |
| 2014/0300457 A1 * | 10/2014 | Geerlings | G07C 9/00309 340/438 |

* cited by examiner

FIG. 6a
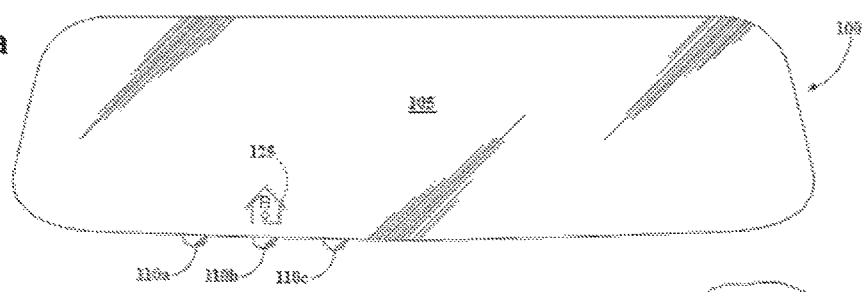
FIG. 6b
FIG. 7
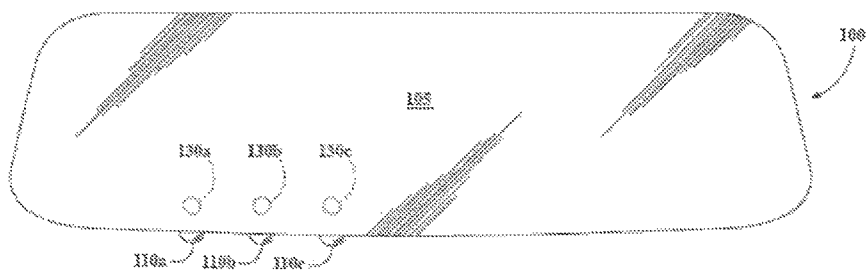

INTERIOR REARVIEW MIRROR ASSEMBLY WITH INTEGRATED INDICATOR SYMBOL

CROSS-REFERENCE TO RELATED APPLICATIONS

This application is a continuation of U.S. patent application Ser. No. 12/898,283 filed Oct. 5, 2010, which is a continuation-in-part of U.S. patent application Ser. No. 12/885,191 filed Sep. 17, 2010, the entire contents of which are hereby incorporated by reference.

TECHNICAL FIELD

This invention relates generally to interior rearview mirror assemblies for vehicles and, more particularly, to interior rearview mirror assemblies having touch screen inputs corresponding to a symbol.

BACKGROUND OF THE INVENTION

Conventional systems for controlling appliances and devices, such as garage door openers, security gates, home alarms, lighting, computers, etc., use individual remote controls to operate a respective appliance and/or device. With this conventional system, it is difficult to control multiple devices or appliances, much less consolidate operation of the appliances and devices into a single, controllable system. For example, garage door opener mechanisms open and close a garage door in response to a radio frequency (RF) control signal. The control signal is typically generated and transmitted from a remote control that is sold with the garage door opener. The control signal has a preset carrier frequency and control code such that the garage door opener mechanism is responsive only to the remote control issuing the associated control signal. A problem associated with this type of system is that the door opener must receive a specific predetermined control signal in order to be operated. That is, each appliance and device must receive a specific predetermined control signal. Therefore, a user wishing to control multiple appliances and/or devices is required to have multiple remote controls.

Communication systems currently exist which enable multiple appliances and devices to communicate with a central or single remote device. One such system is Homelink™, owned by Johnson Controls, Inc., in which a trainable transceiver is able to "learn" characteristics of received control signals such that the trainable transceiver may subsequently generate and transmit a signal having the learned characteristics to a remotely controlled device or appliance. For example, one such system is disclosed in U.S. Pat. No. 5,854,593, hereby incorporated by reference. Another such system is disclosed in European Patent No. 0 935 226 B1, also hereby incorporated by reference.

FIG. 1 illustrates an example of an electrical circuit of a trainable transceiver in block and schematic form. Trainable transceiver 43 includes a conventional switch interface circuit 49 connected to one terminal of each of the push-button switches 44, 46, and 47. In addition to microcontroller 57, transceiver circuit 55 includes an RF circuit 58 coupled to microcontroller 57 and to an antenna 59. Each of switches 44, 46, and 47 may each correspond to a different device or appliance to be controlled such as different garage doors, electrically operated access gates, house lighting controls or the like, each of which may have their own unique operating RF frequency, modulation scheme, and/or security code. Thus, switches 44, 45, and 47 correspond to a different RF channel for trainable transceiver 43.

Systems, such as those described above, may be incorporated as a feature into a vehicle to provide users with easy access to wireless devices and appliances. One such embodiment is illustrated in FIG. 2, which shows an interior rearview mirror assembly. Interior rearview mirror 10 has a reflective surface 11 encased in a frame or bezel 12. User inputs 18a correspond, for example, to switches 44, 46, and 47 of FIG. 1 and likewise operate a different device or appliance to be controlled. Appearing on each of the inputs 18a is a logo, icon, indicia or graphics, such as a vehicle logo, and may have other appearances as desired. For example, the Homelink™ icon appears on three of the four user inputs 18a, each of which may be backlit with one or more illumination sources or LEDs. Selection of a user input 18a operates to backlight the input, indicating selection of the corresponding user input 18a. Alternatively, as illustrated, each user input 18a may not be backlit, but instead illuminates LED 22 when selected.

FIG. 3 shows a touch-sensitive interior rearview mirror assembly in accordance with the prior art. Reflective element 410' includes a surface capacitive touch screen or touch screen system incorporated at the mirror glass, and is able to determine the location of a touch at the front surface 410b' of the reflective element 410' by sensing current flow at discrete locations. When the mirror and touch screen system are activated, the touch screen may determine the location of a touch at the front surface of the reflective element 410'. For example, when a finger 472' touches the front surface 410b' of the reflective element 410', the finger conducts or draws current away from the glass. The sensed current is detected by a controller to determine the location of the finger 472' on the reflective element 410'. The location detected may also correspond to a character or number of a keypad, for example, which in turn generates an appropriate signal to appropriate circuitry in the mirror system.

SUMMARY OF THE INVENTION

In general terms, this invention relates to interior rearview mirror assemblies for vehicles and, more particularly, to interior rearview mirror assemblies having touch screen inputs corresponding to a symbol. Although the embodiments described below are with reference to an interior rearview mirror assembly, it is appreciated that this invention may also be used with any interior or exterior mirror assembly.

In one embodiment of the invention, there is a mirror assembly for a vehicle, including a reflective element configured to accept an input; a mirror housing to support the reflective element, wherein the reflective element is operable to sense a touch or proximity of the input so as to determine a point on the reflective element corresponding to the sensed input.

In another embodiment of the invention, there is a mirror system of a vehicle, including a rearview mirror assembly for a vehicle having a reflective element configured to accept an input and a mirror housing to support the reflective element, wherein the reflective element is operable to sense a touch or proximity of the input so as to determine a point on the reflective element corresponding to the sensed input, and the reflective element is a transflective element such that the at least one symbol is visible upon activation and hidden during deactivation.

In one aspect of the invention, the point on the reflective element corresponds to at least one symbol disposed behind said reflective surface, the activation of which causes the symbol to be illuminated.

In another aspect of the invention, the reflective element is configured as a resistive element comprising at least two electrically conductive layers separated by a narrow gap, wherein when the input selects the point on the reflective element's outer surface, the at least two electrically conductive layers become connected at that point causing a change in electrical current and activates or deactivates the at least one symbol.

In still another aspect of the invention, the reflective element is configured as a capacitive element comprising an insulator coated with a conductor such that touching an outer surface of the reflective element allows a measurable change in capacitance which activates the at least one symbol at the point.

In yet another aspect of the invention, the capacitive element is one of a surface capacitive element, a projected capacitive element, a mutual capacitive element and a self capacitive element.

In another aspect of the invention, the reflective element is configured as an optical image sensor having at least one image sensor located at edges behind the reflective element such that when the input is sensed, it is triangulated to locate the point on the reflective element corresponding to the sensed input.

In yet another aspect of the invention, the reflective element is configured as an opto-electrical sensor having at least one photodetector behind the reflective element such that a change in level of illumination is detected causing activation or deactivation of the at least one symbol.

In still another aspect of the invention, the reflective element is transflective such that the at least one symbol is visible upon activation and hidden upon deactivation.

In another aspect of the invention, the at least one symbol is activated by at least one of the following conditions: selection of the input, starting an ignition of the vehicle, opening of a vehicle door, status of vehicle headlamps, user-activated feature and sensing user movement.

In yet another aspect of the invention, an intensity of the at least one illumination source is dependent on at least one of sensitivity of ambient light, status of the headlamps, and intensity of vehicle dashboard lighting.

In still another aspect of the invention, the at least one symbol is located such that it illuminates a portion of an edge of the reflective element.

In another aspect of the invention, the at least one symbol is a multi-color symbol configured to indicate various functions corresponding to a controllable device actuated by the input.

In yet another aspect of the invention, the at least one symbol is a reconfigurable display.

In still another aspect of the invention, the at least one illumination source is at least one of: a light emitting diode, organic light emitting diode, inorganic light emitting diode, electroluminescent light emitting junction, element and multiple elements.

In another aspect of the invention, the reflective element is not supported by a bezel.

In yet another aspect of the invention, activation of the at least one symbol provides at least one of a tactile feedback and an audible response.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 6a shows an exemplary interior rearview mirror assembly in accordance with one embodiment of the invention.

FIG. 6b shows an exploded view of an element appearing on the interior rearview mirror assembly of FIG. 6a.

FIG. 7 shows an exemplary interior rearview mirror assembly in accordance with one embodiment of the invention.

DETAILED DESCRIPTION OF A PREFERRED EMBODIMENT

The invention relates to a mirror assembly for vehicles and, more particularly, to a rearview mirror assembly having selectable inputs or buttons corresponding to a reflective element displayed on a reflective surface of the mirror. The mirror assembly may be an interior or exterior mirror assembly, such as a vanity mirror, rearview mirror, side view mirror, etc.

Figure 1:
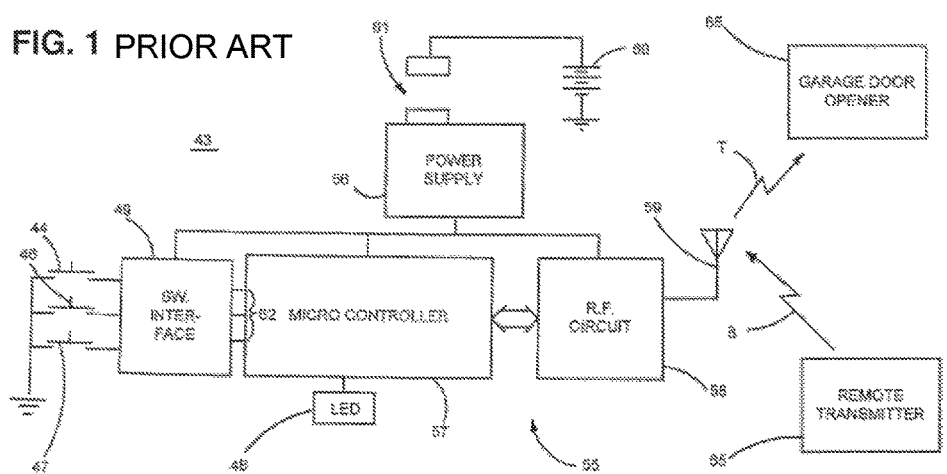
FIG. 1 illustrates an example of an electrical circuit of a trainable transceiver in block and schematic form.
Figure 2:
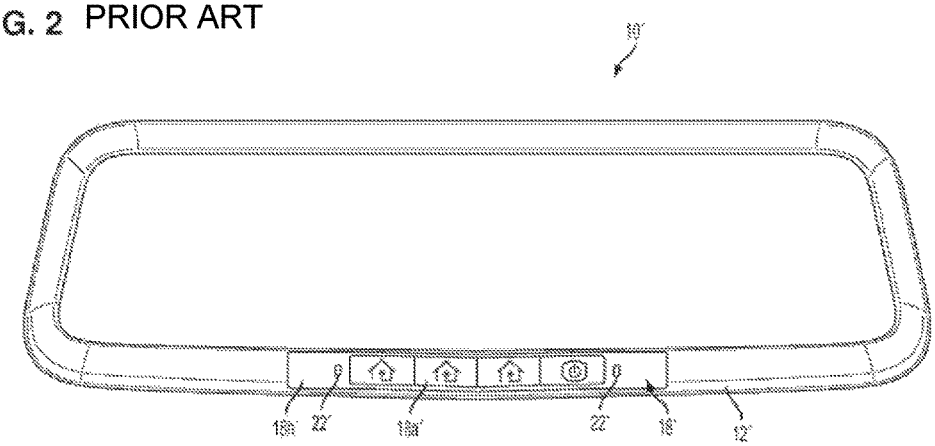
FIG. 2 shows an interior rearview mirror assembly in accordance with the prior art.
Figure 3:
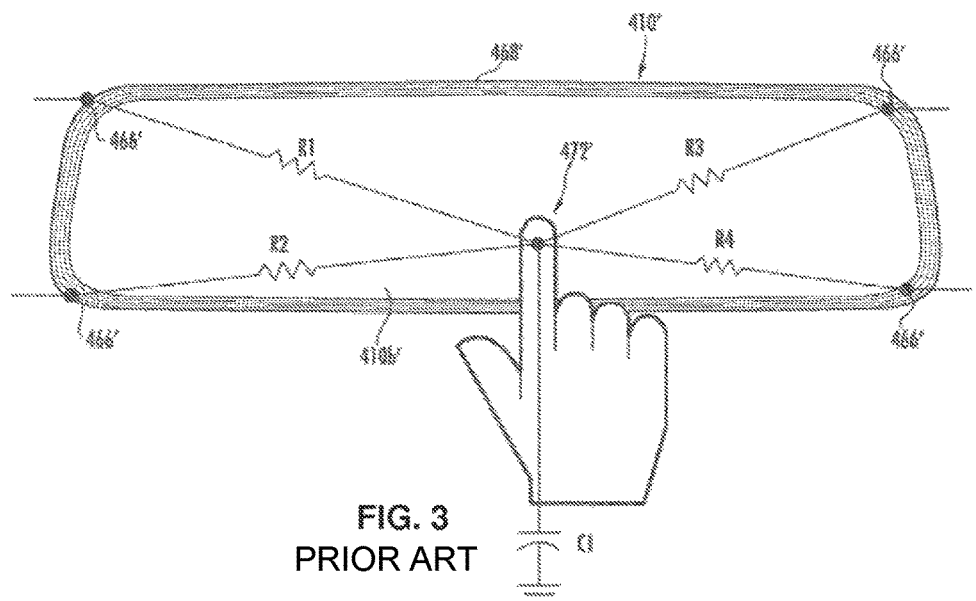
FIG. 3 shows a touch-sensitive interior rearview mirror assembly in accordance with the prior art.
Figure 4:
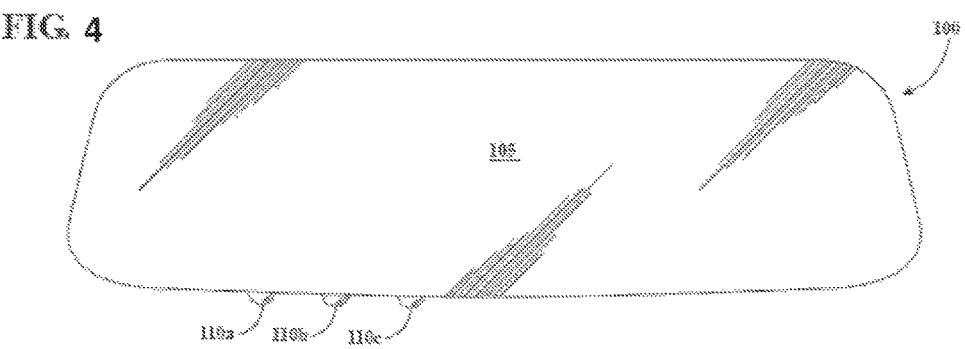
FIG. 4 shows an exemplary interior rearview mirror assembly in accordance with one embodiment of the invention.

FIG. 4 shows an exemplary interior rearview mirror assembly in accordance with one embodiment of the invention. An interior rearview mirror assembly 100 for a vehicle includes a reflective element 105 and inputs 110a, 110b and 110c. The reflective element 105 may be partially transmissive, partially reflective, transflective, etc. such that objects behind the element may be viewed, while at least partially maintaining the reflectivity of the element to act as a mirror. Moreover, the reflective element may be electrochromatic or any other type of reflective element as readily understood in the art. The mirror assembly 100 does not have a traditional frame or bezel, contrary to the conventional mirror illustrated in FIG. 2 (although the mirror assembly may include the traditional frame or bezel). That is, the mirror assembly appears without a retaining bezel and provides full reflectivity on the face of the reflective element 105. Without a retaining or structurally supporting bezel, the inputs (or buttons) 110a, 110b and 110c may no longer be located on the bezel itself. Rather, the inputs 110a, 110b and 110c are relocated to the structure or housing (FIG. 9, 102) now supporting the reflective element 105, as illustrated. It is understood that the number of inputs and location of the inputs is not limited to the depicted embodiment, but may include any number of inputs and any location as readily understood by the skilled artisan.

Similar to the conventional mirror assembly discussed above, appearing on each of the inputs 110a, 110b and 110c is a logo, icon, indicia or graphics, such as a vehicle logo, and may have other appearances as desired. For example, the Homelink™ icon appears on the inputs 110a, 110b and 110c, each of which may be backlit with one or more illumination sources or LEDs. However, given the new location of the inputs 110a, 110b and 110c, it becomes difficult for a user (e.g., driver) to see the backlit input (or a separate indicator light).

Figure 5:
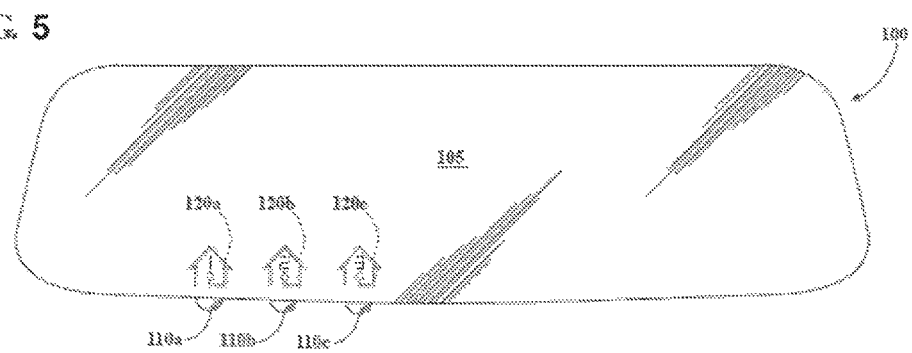
FIG. 5 shows an exemplary interior rearview mirror assembly in accordance with one embodiment of the invention.

FIG. 5 shows an exemplary interior rearview mirror assembly in accordance with one embodiment of the invention. The mirror assembly 100 includes, for example, reflective element 105; inputs 110a, 110b and 110c; and symbols 120a, 120b and 120c. Illumination elements or sources (FIG. 9, 112) are disposed behind reflective element 105, and include a display device or element, such as an illumination source in the form of a light emitting diode (LED) or an array of LEDs, multi-color LEDs or a multi-color display or similar and/or corresponding circuitry. The illumination sources, when illuminated, form symbols 120a, 120b and 120c, which are readily visible through the reflective element 105 when any one of the illumination sources is activated. The illumination sources may be separate from the symbols (e.g., the illumination sources act to illuminate the symbols), or part of the symbols (e.g., the illumination sources are also the symbols themselves). It is therefore understood that the terms "illumination sources" and "symbols" may be interchangeable or separate elements. The symbols 120a, 120b and 120c are activated and deactivated, for example, by user or automatic selection of a corresponding input 110a, 110b and 110c; start of an ignition in the vehicle; opening of a vehicle door, etc. The user may select and determine which of the aforementioned systems enables activation of the symbols, as well as the length of activation of the symbols. The symbols may also act as an indicator to indicate that a device or appliance operated by inputs 110a, 110b and 110c is being controlled, as well as provide the status of the device. The illumination sources may be disposed at a circuit element, such as a printed circuit board, and the circuit element may include or support or be connected to circuitry associated with the illumination sources and/or display device, dimming control or any other accessory or system associated with the mirror assembly 100 in the vehicle. Moreover, the brightness and color of the illumination sources and/or symbols when activated are not limited to a single level. Rather, brightness and color may be tied to various factors, such as amount of ambient light, user selection, headlamp status, user movement or any other factor. Ambient light may also determine the intensity of the illumination source and/or symbol. It is also appreciated that the illumination sources and/or symbols may be in any form, shape or pattern, including characters, symbols, numbers, etc., and are not limited to the specific embodiments illustrated in the drawings.

FIG. 6a shows an exemplary interior rearview mirror assembly in accordance with one embodiment of the invention. In this embodiment, the interior rearview mirror assembly 100 is similar to that described with respect to FIG. 5. However, instead of providing multiple symbols 120a, 120b and 120c that correspond to each of inputs 110a, 110b and 110c, respectively, this embodiment discloses a single symbol 125 that is configured to be used with any one or all inputs 110a, 110b and 110c. That is, symbol 125 may also include an indicator, such as an LED, that is also operable to indicate selection of one of inputs 110a, 110b or 110c. For example, if input 110a is selected, symbol 125 is activated such that it becomes visible to the user from behind reflective element 105. Additionally, the symbol 125 displays a number (depicted in the illustrated embodiment) that corresponds to input 110a. However, symbol 125, which may be an LED, may be illuminated to provide the number "1," which number corresponds to input 110a. Additionally, the input(s) may correspond to a specific device or appliance, such as a garage door, lights, etc. or activate the display of the status of any device or appliance being controlled. Similar to the embodiment illustrated in FIG. 5, the displayed symbol 125 may be substantially or completely hidden (i.e., not visible) to the person viewing the mirror assembly 100 when the mirror assembly is mounted in the vehicle, and when the symbol 125 is not activated. This enables the mirror assembly 100 to be fully utilized as a rearview mirror without distraction on part of a user.

FIG. 6b shows an exploded view of an element appearing on the interior rearview mirror assembly of FIG. 6a. In the illustrated embodiment, in addition to symbol 125 illuminating during activation as described above, symbol 125 may also have a reconfigurable display, for example, a seven-segment indicator (represented by the "8" in the drawings) that is capable of indicating which of the corresponding inputs 110a, 110b and 110c (which inputs correspond to a device or appliance, as described above) has been selected. The symbol 125 and reconfigurable display may be activated/deactivated together or separately to create different visual responses. Additionally, the color (or multiple colors), brightness, activity, etc. of the symbol 125 and the reconfigurable display may be the same or provided differently for visual response or otherwise. Text, characters, symbols, etc. may also be displayed as part of symbol 125 and/or the reconfigurable display. Moreover, the reconfigurable display may be any display as readily understood in the art, including segmented, dot matrix, TFT, LCD, etc. Symbol 125 may also be configured to illuminate for a predetermined or user-selectable amount/length of time.

FIG. 7 shows an exemplary interior rearview mirror assembly in accordance with one embodiment of the invention. Although the indicators 130a, 130b and 130c, as illustrated in this embodiment, are displayed (when activated) as a single LED, the indicator(s) may appear in any desired shape or pattern, and in any color. Additionally, the indicator(s) may have a brightness that varies with ambient light or is set to a desired level. While LED(s) are used as the indicators 130a, 130b and 130c in the preferred embodiment, it is appreciated that any type of illumination source may be used. For example, an organic or inorganic light emitting diode, electroluminescent light emitting junction or element or multiple elements may be included and located at or disposed at or behind the reflective element 105. It is also appreciated that the indicators may be located anywhere behind the reflective element 105, including along the edge of the reflective element 105, thereby intentionally lighting the edge of the reflective element 105 in a specific area.

Figure 8:
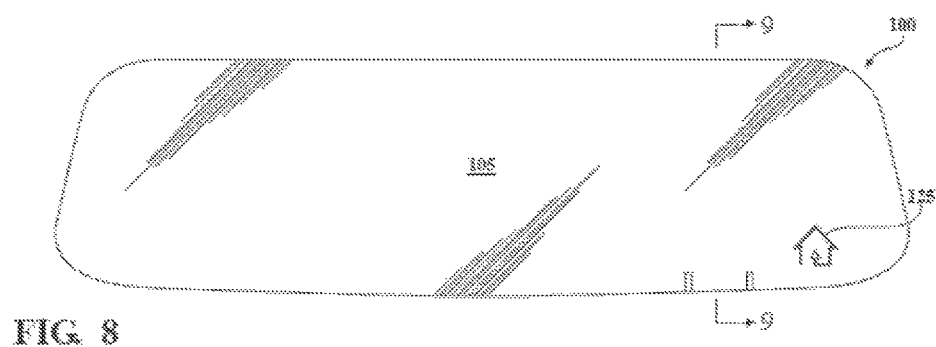
FIG. 8 shows an exemplary touch-sensitive interior rearview mirror assembly in accordance with one embodiment of the invention.

FIG. 8 shows an interior rearview mirror assembly in accordance with one embodiment of the invention, where the mirror assembly is a touch screen. The mirror assembly 100 includes, for example, a reflective element 105, symbol 125 and the structure shown in cross section in FIG. 9. The touch screen provides the mirror assembly 100 with the ability to detect the touch or approach of an input device, such as a user's finger, pen or similar at any location on the reflective element 105 (although it is understood that all or only a portion or multiple portions of the reflective element may be touch sensitive).

Figure 9:
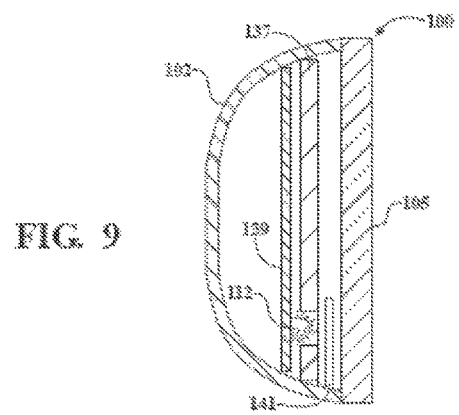
FIG. 9 shows a cross-sectional view of the mirror assembly of FIG. 8 in accordance with one embodiment of the invention.

FIG. 9 shows a cross-sectional view 9-9 of the mirror assembly of FIG. 8 in accordance with one embodiment of the invention. As shown in the cross-sectional view, the mirror assembly 100 includes, for example, a housing 102, a reflective element 105, an illumination source 112 (in this embodiment depicted as a light source), a light guide 137, a printed circuit board (PCB) 139 and a sensor 141. The illumination source 112, located behind the reflective element 105, may also be touch sensitive. It is also appreciated that while the illumination source 112 is illustrated as a light source in the depicted embodiment, it may also form symbol 125, which is readily visible through the reflective element 105. That is, illumination source 112 may be separate from the symbols, or part of the symbols. The illumination sources include a display device or element, such as illumination source 112 in the form of an LED, array of LEDs, multi-color LEDs, OLED and an array of OLEDs or multi-color display or similar and/or corresponding circuitry.

The mirror assembly 100 may use any known touch-sensitive or non-contact technology to determine input proximity to the reflective element 105. In this embodiment, indicators 110a, 110b and 110c (shown in FIGS. 10 and 11) may also act as inputs (i.e., the indicators may act as only an indicator or an input, or together as an indicator and an input). Indicators 110a, 110b and 110c are activated/deactivated when sensor 141 detects an input on or approaching the mirror assembly 100. In the illustrated embodiment, upon activation of the indicators 110a, 110b and/or 110c, illumination source 112 emits light to light guide 137. Light guide 137, located behind the reflective element 105, delivers light onto the rear side of reflective element 105 such that it is transmitted through the reflective element 105 at selected portions. The PCB 139 (or alternatively circuit elements), responsible for operation, include touch controller circuitry and/or other circuitry or sensors or accessories depending on the desired application of the mirror assembly. The PCB 139 may be located within the housing 102, or at a location remote from the mirror assembly (such as within the vehicle or a location remote from the vehicle). The PCB 139 may also include the Homelink™ circuitry, or may be completely dependent therefrom. Additionally, although the indicators 110a, 110b and 110c, as illustrated in this embodiment, are displayed/visible (when activated) as a single LED, the indicator(s) may appear in any desired shape or pattern, and in any color. Additionally, the indicator(s) may have a brightness that varies with ambient light or is set to a desired level.

Detecting of an input on or approaching the mirror assembly 100 may include, but is not limited to, optical, capacitive, projected capacitive, resistive, etc. or any other electro-optic and non-electro-optic technology. For example, in an optical touch screen, a light element(s) may be disposed at or near an optical sensor to gather and direct light toward the optical sensor. An input touching or approaching the screen may change the light sensed at the optical sensor, thereby actuating portion(s) of the screen that correspond to the detection. In a capacitive touch screen technology, for example, the location of a touch on the reflective element 105 by an input is detected by sensing the current flow at multiple discrete locations around the reflective element 105. In one embodiment of a capacitive touch screen, a user's finger touching the screen conducts or draws currently away from the screen. The amount of current that flows through various locations in proximity to the touched area of the screen is measured, and the location of the area on the screen touched, which may correspond for example to indicator 110b, is determined. A signal corresponding to the selection of the associated indicator 110b may then be generated accordingly. For example, symbol 125 may be illuminated to indicate that indicator 110b has been selected. It is appreciated that any touch sensor or sensitive technology readily understood in the art may be applied and implemented in this application and is not limited to the specific embodiments described herein, which embodiments are used for illustrative purposes.

Figure 10:
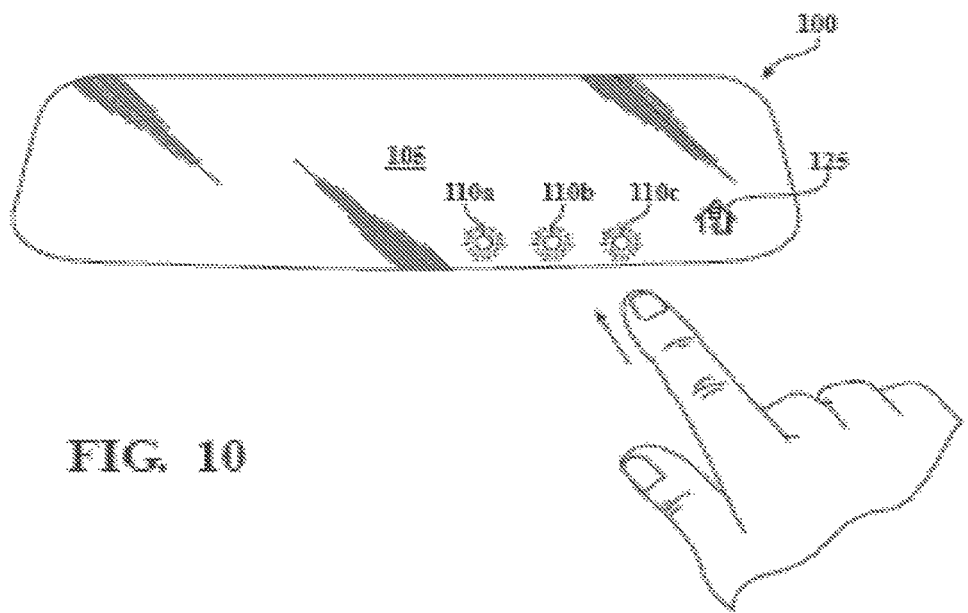
FIG. 10 shows an exemplary touch-sensitive interior rearview mirror assembly in accordance with one embodiment of the invention.
Figure 11:
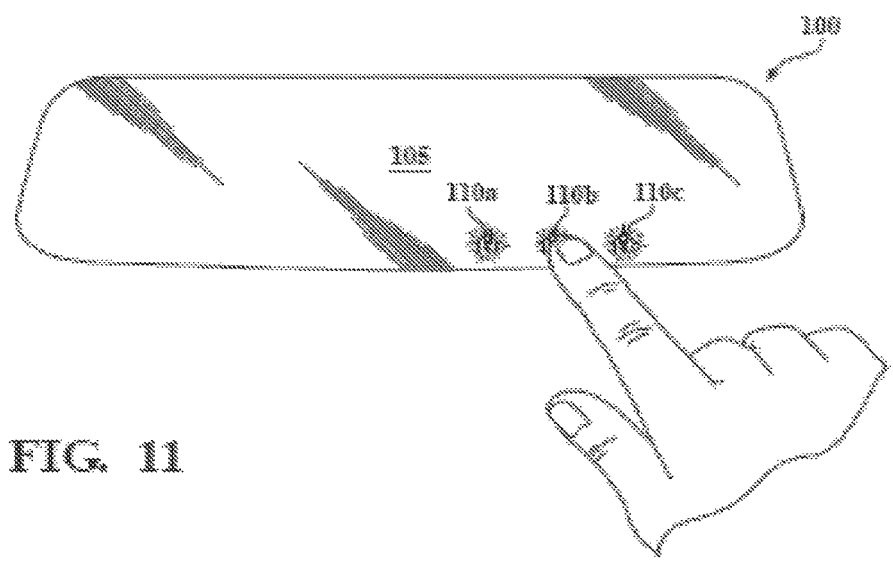
FIG. 11 shows another exemplary touch-sensitive interior rearview mirror assembly in accordance with one embodiment of the invention.

FIG. 10 shows an exemplary touch-sensitive interior rearview mirror assembly in accordance with one embodiment of the invention, and FIG. 11 shows another exemplary touch-sensitive interior rearview mirror assembly in accordance with one embodiment of the invention. In the embodiment of FIG. 10, a user input (i.e., finger) is approaching the mirror assembly 100 for selection (activation/deactivation) of one or more of indicators (and/or input) 110a, 110b and 110c. The embodiment of FIG. 11, on the other hand, shows user selection of a specific indicator, namely indicator 110b. Although in each of FIGS. 10 and 11 inputs 110a, 110b and 110c are illustrated as visible, they may be visible all the time or only when the illumination source (e.g., LED back light) is activated. If not visible, the indicator(s) can be lit (made visible) for a variable period of time based on another input from the vehicle, such as opening the door, turning on interior lights, starting the car, etc. which will allow the user to recognize this hidden feature. The method of activation and length of time could be programmable by a user, such as from a vehicle message center. As earlier described, the inputs may also be characters, numerals or symbols. The entire character, numeral or symbol or a portion thereof (such as the center of symbol 125) can be backlit by a single monochrome LED, use a multi-color display, or any other method known in the art. Additionally, the three indicators 110a, 110b and 110c (here shown as symbols, such as symbol 125) as illustrated are only one embodiment. It is understood that any number of inputs and/or symbols may be used on the touch screen, and that any indicator (input) and/or symbol may be separate or the same elements (i.e., the symbol 125 may also act as an input and/or indicator and vice versa), as described above with reference to FIGS. 4-7.

It is also appreciated that in addition to the function associated with selection of an indicator, tactile feedback may be provided when an indicator 110a, 110b or 110c or a symbol 125 is selected (i.e., touched) by a user, for example as an indication that the indicator has been properly selected. The tactile feedback may also indicate which of the indicators has been selected. For example, selection of a first indicator 110a may illicit a single short vibration, whereas selection of a second indicator 110b may illicit two short vibrations. Alternatively, selection of a symbol(s) 125 may be indicated through the speakers in the vehicle or built into the mirror assembly itself.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

The invention claimed is:

1. A rearview mirror assembly for a vehicle, comprising:
a reflective element;
a transmitter for selectively transmitting activation signals to a plurality of different remote devices;
a plurality of inputs for receiving user inputs that cause the transmitter to transmit an activation signal to the plurality of different remote devices;
a mirror housing to support the reflective element, the transmitter, and the plurality of inputs; and
a symbol disposed behind said reflective element,
wherein the symbol is illuminated upon receipt of a user input by any one of the plurality of inputs,
wherein the symbol includes a reconfigurable display for displaying a selected number, wherein the selected number is selected from a plurality of numbers corresponding to each one of the plurality of inputs, wherein the selected number is selected based upon which one of the plurality of inputs received a user input such that the reconfigurable display displays a number within the symbol corresponding to the input, and
wherein the reflective element is transflective such that the symbol is visible when illuminated and hidden when not illuminated.

2. The rearview mirror assembly of claim 1, wherein the symbol remains illuminated for a predetermined time period.

3. The rearview mirror assembly of claim 1, wherein the symbol remains illuminated for a user-selectable time period.

4. The rearview mirror assembly of claim 1, wherein the symbol is illuminated for a predetermined time period following one of the following conditions: ignition of the vehicle and opening of a vehicle door.

5. The rearview mirror assembly of claim 1, wherein the reconfigurable display is a seven-segment indicator.

6. The rearview mirror assembly of claim 1, wherein the reconfigurable display is a display selected from the group consisting of a segmented display, a dot matrix display, a TFT display, and an LCD.

7. The rearview mirror assembly of claim 1, wherein the reconfigurable display and the symbol are activated/deactivated separately.

8. The rearview mirror assembly of claim 1, wherein the reconfigurable display and the symbol are activated/deactivated together.

* * * * *